US006671738B1

United States Patent
Rajchel et al.

(10) Patent No.: US 6,671,738 B1
(45) Date of Patent: Dec. 30, 2003

(54) SYSTEM AND METHOD OF ASSOCIATING AN OBJECT WITH A WORLD WIDE WEB (WWW) SITE

(75) Inventors: Suzanne K. Rajchel, Wheaton, IL (US); Michael G. Ressl, Western Springs, IL (US)

(73) Assignee: Vantageport, INC, Western Springs, IL (US)

( * ) Notice: Subject to any disclaimer, the term of this patent is extended or adjusted under 35 U.S.C. 154(b) by 0 days.

(21) Appl. No.: 09/441,311

(22) Filed: Nov. 16, 1999

Related U.S. Application Data
(60) Provisional application No. 60/108,474, filed on Nov. 16, 1998.

(51) Int. Cl.[7] ............................................. G06F 15/16
(52) U.S. Cl. ..................................... 709/245; 709/217
(58) Field of Search ................................ 709/245, 217, 709/219, 203, 224, 226, 225, 229

(56) References Cited

U.S. PATENT DOCUMENTS

| 6,122,520 A | * | 9/2000 | Want et al. | ........... 455/456 |
| 6,138,072 A | * | 10/2000 | Nagai | ........... 340/988 |

* cited by examiner

*Primary Examiner*—Mehmet B. Geckil
(74) *Attorney, Agent, or Firm*—Cardinal Law Group

(57) ABSTRACT

A method and system for associating an object with a web site is provided. An object in space is identified with unique object-identifying coordinates. These coordinates are compared with a database of object-identifying coordinates that correspond to unique web site identifiers and at least one web site identifier corresponding to the object-identifying coordinates is selected. Once the web site identifier is selected, WWW data may be downloaded relating to the object identified by the object-identifying coordinates. This data may be downloaded with minimal or no intervention from a mobile user once the system has identified the object-identifying coordinates of the object.

27 Claims, 3 Drawing Sheets

SYSTEM AND METHOD OF ASSOCIATING AN OBJECT WITH A WORLD WIDE WEB (WWW) SITE

RELATED APPLICATION

This application claims the benefit of U.S. Provisional Application Serial No. 60/108,474 entitled "Apparatus, System and Method for Obtaining World Wide Web (WWW) Data with Reference to a Volume (Object) in Space," filed Nov. 16, 1998, the entire specification of which is incorporated herein by reference.

FIELD OF THE INVENTION

This invention pertains to communicating World Wide Web (WWW) information to the user of a computing device, through the Internet. Specifically, the WWW information is downloaded based on the selection by the user of an object (volume in space or VIS) rather than by other common methods currently in use. The present invention allows WWW information to be downloaded based on the particular coordinates or other unique identifying data of the object (volume) in space selected by the user.

BACKGROUND OF THE INVENTION

One limitation currently facing users of the WWW is the linkage of the user interface to the display of the computing device (laptop, handheld computer, mobile phone, etc.) In other words, the user is required to manually select data from the display or input data directly to the computing device via a mouse or other input device (e.g. flywheel, touch screen, stylus, or keyboard). The user typically "points" to an icon or text on the display of the computing device by using the input device (pointing with the mouse, typing an input command, tapping with the stylus, etc.). The user then "selects" the icon or text which is linked to a WWW site, causing information to be exchanged over the Internet and the WWW data (a "page") linked to the icon/text to be displayed on the user computing device, usually through a browser program.

This input method may be acceptable for users who are seated at a computer or in a position to devote full attention (eyes and mind) to the computer's display and input mechanism. However, users who are mobile (on foot or in a vehicle) cannot always devote full attention to a display and to providing input data through conventional means. Furthermore, the mobile user may be interested in types of WWW information other than that available to the stationary user. For instance, mobile users may have an interest in receiving information specific to their location or to a VIS proximate to their location.

Current WWW users are generally restricted to a limited number of methods for selecting WWW data (Uniform Resource Locator or URL): (1) by selecting "hyperlinks" that are visually displayed by the computing device (by "pointing and clicking"); or, by (2) manually typing in a URL address. These current methods do not provide ease of use in the context of a mobile or portable user of a computing/communications device, especially if this device is small (e.g. a handheld or laptop device).

Means for obtaining information on an object in space are also currently limited.

Identification systems have been used in packaging where an identifying number has been encoded in a chip. The unit is energized by a magnetic field and then responds electronically or vice-versa. Maximum working distance for this technology is about 1 meter. Railroads have used bar code technology to remotely identify rail cars but this technique is defeated as the cars become dirty. That technique is also limited to about 10 meters.

Range-finders are commonly used to determine distance in conjunction with compass readings and GPS position in order to determine position, for example in surveying applications. Existing range-finders, however, are not used to determine or even access the information available to the user via the WWW.

GPS systems are routinely used in vehicle positioning systems; e.g. Cadillac offers an optional system to locate your car relative to maps in an on-board computer device. The problem with GPS as implemented is that it determines the position of the vehicle, not a VIS proximate the vehicle. Furthermore, current implementations of the system do not allow WWW access based on either the vehicle position or a VIS proximate the vehicle.

It would be desirable therefore to provide unique means of obtaining WWW data to mobile users. Therefore, a system for accurately determining the address, location, or identification of various structures and for interfacing with the VIS specific WWW URL is desirable.

DETAILED DESCRIPTION OF THE PRESENTLY PREFERRED EMBODIMENTS

Figure 1:
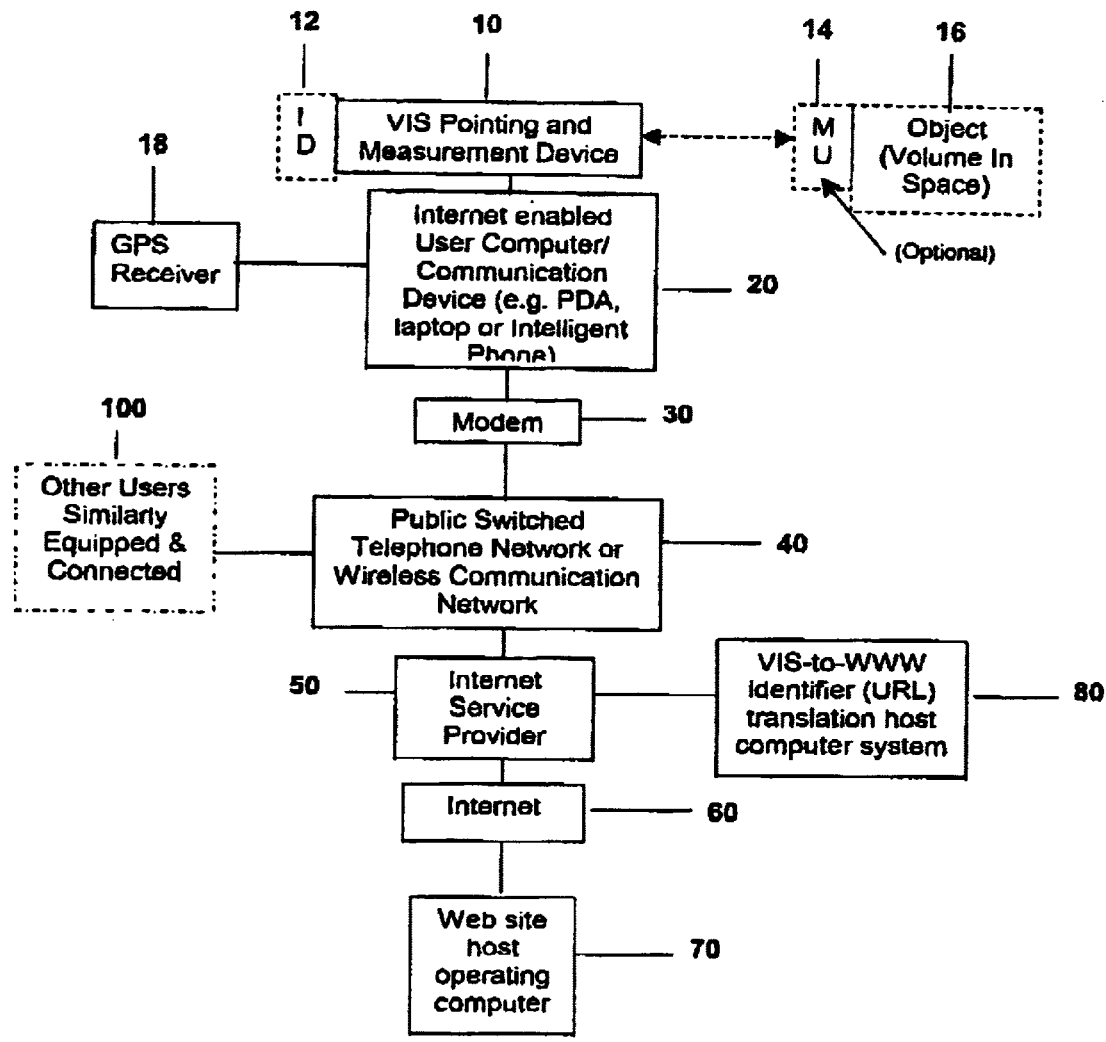
FIG. 1 is a functional block diagram of an embodiment of a communication system in accordance with the present invention.

Referring now to FIG. 1, one embodiment of a communication system in accordance with the present invention is shown. This embodiment expands upon and increases the utility and functionality of the system described in U.S. Provisional Application Serial No. 60/089,382 (filed Jun. 15, 1998), now U.S. application Ser. No. 09/332,609, which is incorporated herein by reference.

The communication system 5 of FIG. 1 includes a VIS pointing device 10, such as, for example, a range-finder device. Preferably, VIS pointing device 10 determines the position of a VIS (object) 16 relative to the user by means of angular direction and range-finding. VIS pointing and measurement device 10 may include an interrogating device (ID) 12 interacting with an object-mounted unit (MU) 14. The MU 14 may be encoded with a distinct identifier, and placed beforehand on the object 16 to be identified. The MU 14 could be a passive unit that is then interrogated by the ID 12. The MU 14 may transfer its encoded information to the ID 12 via reflected energy.

MU 14 could be an identification system such as one used in packaging where an identifying number has been encoded in a chip. The unit is energized by a magnetic field and then responds electronically or vice-versa. Maximum working distance for this technology is about 1 meter. Railroads have used bar code technology to remotely identify rail cars but this technique is defeated as the cars become dirty. That technique is also limited to about 10 meters. The device employing a passive MU 14 to be mounted on the object 16 as described above will preferably operate over much greater distance in an application where this type of identification has not been previously applied. Since the object 16 to which the passive MU 14 is mounted does not have to be stationary, it can also be used for tracking of mobile units.

Alternately, the MU 14 may be an active device with computing and transmitting capability of its own. It would communicate with the ID 12 via a predetermined communication protocol. The MU 14 may receive a request from the ID 12 to transmit its unique identifier. The MU 14 would respond by sending the unique identifier to the ID 12. An example of such a protocol that is currently under discussion by standards bodies is called "Bluetooth."

In either case the interrogated MU 14 provides the system 5 with a VIS identification code that is referenced by the system 5 to a VIS specific WWW URL or other identifier (if one exists).

This information from the MU 14 or object 16 is then combined with the position of the user, as determined by GPS or other means, to derive the absolute position of the VIS 16 relative to an appropriate reference coordinate system. Given the coordinates of the VIS 16 as input, the system 5 would then reference the determined position of the VIS 16 with a VIS-specific URL (if one exists) or other WWW identifier and download the WWW data from that site to the Internet-enabled user computer/communications device, which may be located proximate the user or remote from the user.

VIS pointing device 10 may include an optical or RF range-finding device, which is integrated with inclination/declination determination capability. VIS pointing device 10 also may include an apparatus for determining the location coordinates of the user. Preferably, this apparatus is a GPS receiver 18. An Internet-enabled computing/communication device 20 may be incorporated into or attached to device 10. The communication device 20 may be, for example, a PDA (personal digital assistant), hand-held computer, a "smart phone", a laptop or desktop computer, a wireless or wireline communications network interface, or a modem 30. VIS pointing device 10 attached to or incorporating communication device 20 is then connected to an Internet service provider 50 via a communication network 40. The Internet service provider 50 allows an Internet user to access the Internet 60 for the purposes of WWW browsing, email, chat, etc. The Internet service provider 50 offers such services to multiple users, as shown at 100. Therefore, multiple users may use the principles of this invention for VIS-to-Internet access and WWW browsing. In the present embodiment, the user is enabled to download information from a unique web host computer based on VIS coordinates and other optional secondary data. The user may, for example, use Internet service provider 50 to access the host computer 70 operating any given web site.

The VIS pointing device 10 is capable of identifying and/or locating a VIS. Once this VIS has been identified, translation subsystem 80 can be queried regarding that VIS, based on unique object-identifying information, which may be, for example, the identified location of the object. In a first embodiment, translation subsystem 80 may then automatically connect the user with the VIS-specific WWW URL or other unique identifier by requesting that data stored on the web site host computer 70 corresponding to the URL be sent directly to the computer of the user 20. This can be accomplished without user intervention or knowledge, and without intervention by the user computer 20. The WWW information is automatically downloaded and relayed to the user computing/communication device 20 with or without the awareness or intervention of the user.

In a second embodiment, the translation subsystem 80 can then provide pertinent databased information to the user based on the VIS coordinates, in a convenient manner consistent with accepted standards. For example, in the embodiment shown in FIG. 1, the information may be a set of pre-determined WWW identifiers (such as URLs). The database of information may thus include VIS coordinates that identify the object corresponding to the set of WWW identifiers. The translation subsystem 80 determines the unique WWW URL or other identifier (if one exists) associated with the VIS and transmits the WWW identifier (URL) back to the user computing/communication device 20. Once the user computer 20 receives the appropriate URL, it can retrieve and display the WWW data represented by the URL using any standard or acceptable method, such as WWW browser application software. The WWW information is automatically downloaded and relayed to the user computing/communication device 20 with or without the awareness or intervention of the user.

In a third embodiment, the user computer 20 directly communicates with a web site host computer 70 corresponding to a VIS-specific URL derived from encoded information at MU 14.

In all the aforementioned embodiments, the translation subsystem 80 may use other pertinent data along with VIS coordinates to determine the URL or to distinguish between multiple URLs associated with a particular VIS. The WWW unique identifier could be also chosen based on secondary data known to the system 5 along with the coordinates of object 16 or unique identifying information.

The methods of displaying the WWW data represented by the URL can be any standard or acceptable method, including: a visual display and browser program for graphical data, an audio playback mechanism for sound, a video display for video data, or similar output mechanism for any other type of data provided by the WWW. Finally, the system 5 does not require any intervention or modification of the typical web site information. The creation, maintenance, content and control of the WWW information could be (but does not necessarily have to be) performed by a third party.

System 5 allows mobile/portable users to select an object 16 and thereby gain automatic access to pertinent WWW sites. By using VIS pointing device 10 to "point" to the object 16, the user selects object 16 as an input parameter to the system 5. System 5 also provides a means for identifying a unique piece of identifying information about the object 16, which may be, for example, its absolute coordinates in space or other unique identifier. System 5 also provides a means to determine, based on the unique identifying information of the object 16, a WWW URL (or similar unique WWW identifier) related to the object 16, if such a WWW identifier exists.

Furthermore, the system 5 automatically identifies the appropriate URL or other WWW identifier, with or without the awareness or intervention of the user, and provides a means of communicating through the Internet 60 to download WWW information based on the WWW identifier determined by the system 5.

Figure 2:
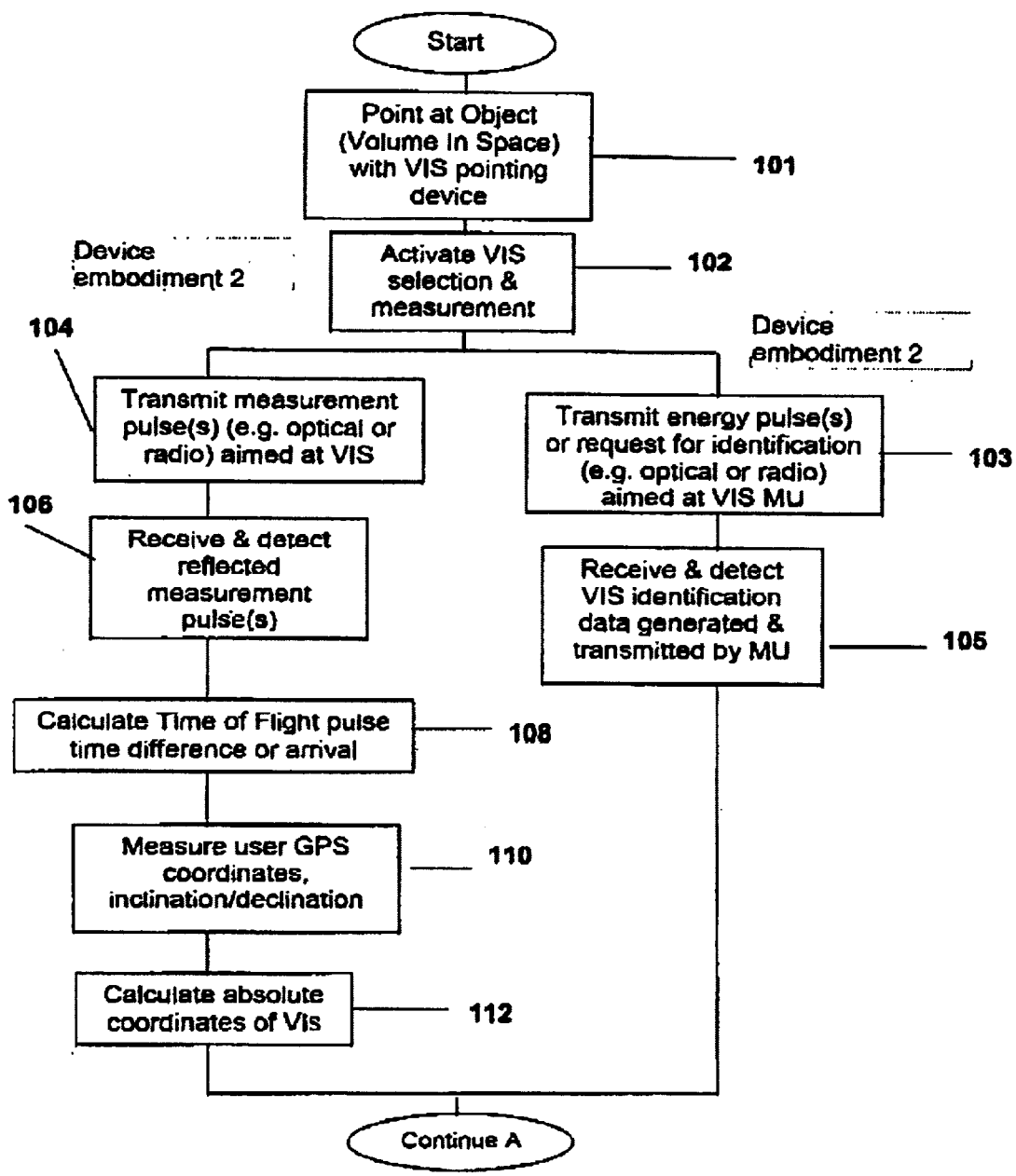
FIG. 2 is a flow chart that illustrates one embodiment of a routine for selecting a web site in accordance with the present invention.

Referring now to FIG. 2, a routine is shown for selecting an object in space and associating the object with a web site. As shown at block 101, a user begins by selecting an object 16 about which he would like WWW information, for example, by pointing at object 16 or at MU 14 mounted on object 16 with pointing device 10. For example, a user might be traveling near a building and want to know if one of the businesses inside the building has a web page. Next the user activates VIS selection and measurement using standard controls on device 10 (Block 102).

In one embodiment of the routine, the device 10 transmits an energy pulse or request for identification (which may be for example, optical or RF energy) while aimed at object 16 or MU 14 mounted on object 16 (Block 103). The object 16 or MU 14 then generates and transmits identification data that is received by device 10 at Block 105.

In another embodiment, device 10 may transmit measurement pulses (which may be for example, optical or RF energy) towards object 16 or MU 14 mounted on object 16 (Block 104). These pulses would measure, for example, the distance, angle and inclination of the object 16 relative to the user. The reflected pulses are received by device 10 and transmitted to the user computer/communication device 20 (Block 106). Device 10 or communication device 20 may also calculate the time of flight based on pulse time difference or arrival as shown at Block 108. As shown at Block 110, a GPS-type receiver 18 may measure the coordinates in space, inclination and declination of the user. Thus, device 10 or communication device 20 may also receive these measurements as additional input. The computing device 20 may then derive the absolute position of the object 16 from the user GPS coordinates and the relative distance/angle/inclination of the object 16 (Block 112).

Figure 3:
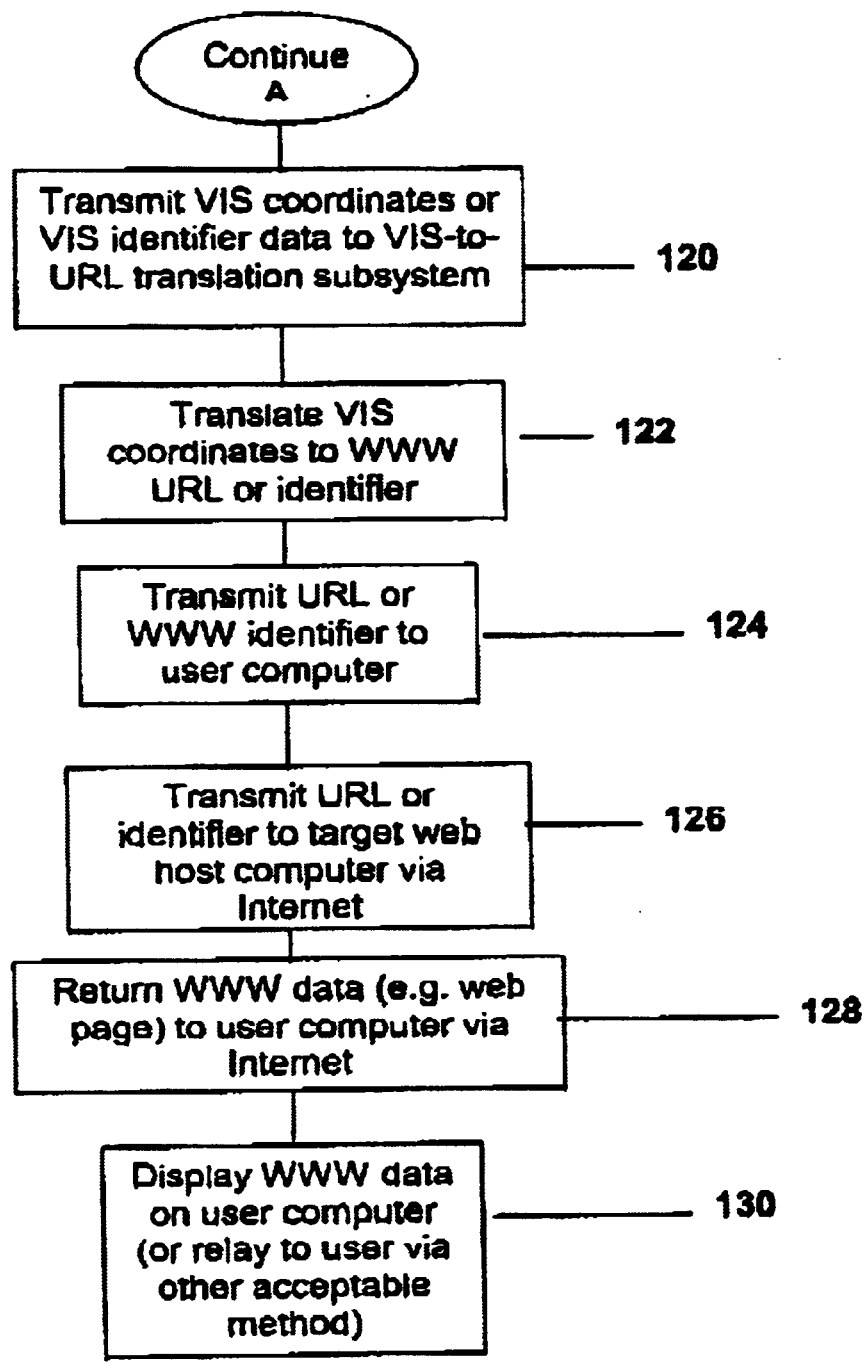
FIG. 3 is a continuation of one embodiment of a routine for selecting a web site in accordance with the present invention.

Referring now to FIG. 3, it can be seen that whether device 10 simply receives object-identifying coordinates from object 16 as shown at Blocks 103–105 or whether device 10 calculates the object-identifying coordinates from various data as shown at blocks 104–112, once these coordinates are determined, system 5 is able to use these coordinates to interface with an appropriate WWW site.

As shown at Block 120, device 10 or communication device 20 transmits the derived VIS coordinates to VIS-to-URL translation subsystem 80. The coordinates may be transmitted via, for example, a communication network 40 using standard communication protocols and methods appropriate to the particular network to whatever computer is host to the translation subsystem 80. The translation subsystem 80 could also be stored on the user computer/communication device 20 or could be a subsystem on a host computer attached to the Internet 60.

The translation subsystem 80 then translates the received VIS coordinates to WWW identifiers, such as for example, a URL (Block 122). Subsystem 80 then transmits the URL or other identifier to communication device 20 Block 124). This device 20 in turn transmits the URL or other identifier to a target web host computer 70 via, for example, the Internet 60 by standard or acceptable methods and protocols, for example, HTTP (Block 126). The desired WWW data is then returned to communication device 20 via, for example, the Internet 60 (Block 128). This data may then be displayed to the user on communication device 20 via any standard or acceptable method.

The ability to accurately determine the address, location, or identification of various structures and to be able to interface with the VIS specific WWW URL has a potentially large market. Identifying a specific structure or object and the downloading data specific to the structure or object will greatly simplify and decrease response times of emergency and delivery services. Such a system would conceivably be used by police, fire, ambulance, or any other type of emergency service, delivery services, postal service, utility services, meter-reading, golf courses, railroads, military vehicles, as well as private use. The ability to automatically access a VIS specific web site/URL or other WWW data expands the market for advertising, education, and e-commerce.

Other potential applications include, but are not limited to: Enhanced or mobile 911; enhanced directory services; air-traffic control; automobile and transportation; automated mass transit; public and private telecommunications systems; construction; geophysical and geologic industries; entertainment; medical; sports; manufacturing; mapping; meteorological applications; forestry management; agricultural industry; mining industry; aviation and nautical industries; HVAC systems; enhanced earth-moving systems; warehouse inventory management; ESDA haz-mat registry; tourism; mobile Internet access; and integration of this system with other systems.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of associating a volume in space with a web site, wherein the volume in space is occupied by a target, comprising the steps of:

determining platform coordinates of a user observation platform, wherein the user observation platform is remote from the volume in space;

interrogating the target occupying the volume in space;

receiving an interrogation signal, the interrogation signal reflected from the target;

determining volume coordinates of the volume in space based on the platform coordinates and the interrogation signal;

comparing the volume coordinates to a database of listed volume coordinates, wherein each listed volume coordinate corresponds to a web site identifier; and selecting at least one web site identifier corresponding to listed volume coordinates which match the volume coordinates.

2. The method of claim 1, further comprising:

associating the volume coodinates with the at least one web site identifier; and storing the volume coordinates and asociated web site identifier in the database.

3. The method of claim 1 wherein the interrogation signal is selected from the group consisting of: a radio frequency signal, an optical signal, and an energy pulse.

4. The method of claim 1 further comprising the steps of:

determining target coordinates of the target;

determining user coordinates of a user; and determining volume coordinates based on the target coordinates and the user coordinates.

5. The method of claim 4 wherein the target coordinates comprise the distance, angle and inclination of the target relative to the user.

6. The method of claim 4 wherein the user coordinates comprise the coordinates in space, inclination and declination of the user.

7. The method of claim 4 further comprising the step of:

calculating the target coordinates based on the interrogation signal.

8. The method of claim 7 wherein the interrogation signal is selected from the group consisting of: a radio frequency signal, an optical signal and an energy pulse.

9. The method of claim 1 further comprising the step of:

downloading web site data corresponding to the selected web site identifier.

10. The method of claim 1 wherein the web site identifier is a Uniform Resource Locator.

11. The method of claim 1 wherein the database comprises a translation subsystem on a host computer.

12. The method of claim 1 wherein the database comprises a translation subsystem on a communication device.

13. A method of downloading web site data, comprising the steps of:

choosing an volume in space as an input parameter, the volume in space occupied by a target;

determining target coordinates of the target based on volume coordinates of the volume in space and on an interrogation signal reflected from the target;

selecting at least one unique web site identifier that corresponds to the target coordinates; and downloading web site data corresponding to the selected web site identifier.

14. The method of claim 13 further comprising the steps of:

sending a request from a translation subsystem to a web site computer corresponding to the selected web site identifier; and sending web site data from the web site computer to a user computer.

15. The method of claim 13 wherein the downloading of web site data is without user intervention.

16. The method of claim 13 further comprising the steps of:

sending a uniform resource locater from a translation subsystem to a user computer;

requesting data from a web site host computer corresponding to the uniform resource locator;

receiving the request at the web site host computer; and sending web site data to the user computer.

17. The method of claim 13 wherein the downloading of web site data is without user intervention.

18. A system of associating a volume in space with a web site, comprising:

means for determining platform coordinates of a user observation platform, wherein the user observation platform is remote from the volume in space;

means for interrogating the target occupying the volume in space;

means for receiving an interrogation signal, the interrogation signal reflected from the target;

means for determining volume coordinates of the volume in space based on the platform coordinates and the interrogation signal;

means for comparing the volume coordinates to a database of listed volume coordinates, wherein each listed volume coordinate corresponds to a web site identifier; and means for selecting at least one web site identifier corresponding to listed volume coordinates which match the volume coordinates.

19. The system of claim 18, further comprising:

means for associating the volume coodinates with the at least one web site identifier; and means for storing the volume coordinates and asociated web site identifier in the database.

20. The system of claim 18 further comprising:

means for determining target coordinates of the target;

means for determining user coordinates of a user; and means for determining volume coordinates based on the target coordinates and the user coordinates.

21. The system of claim 20 further comprising:

means for calculating the target coordinates based on the interrogation signal.

22. The system of claim 18 further comprising the step of:

means for downloading web site data corresponding to the selected web site identifier.

23. Computer program product for associating a volume in space with a web site, the volume in space occupied by a target, comprising:

means for choosing the volume in space as an input parameter;

means for determining target coordinates of the target based on volume coordinates of the volume in space and on an interrogation signal reflected from the target;

means for selecting at least one unique web site identifier that corresponds to the target coordinates; and means for downloading web site data corresponding to the selected web site identifier.

24. The program of claim 23, further comprising:

means for sending a request from a translation subsystem to a web site computer corresponding to the selected web site identifier; and means for sending web site data from the web site computer to a user computer.

25. The program of claim 23, further comprising:

means for sending a uniform resource locater from a translation subsystem to a user computer;

means for requesting data from a web site host computer corresponding to the uniform resource locator;

means for receiving the request at the web site host computer; and means for sending web site data to the user computer.

26. A system for associating a volume in space with a web site, the volume in space occupied by a target, comprising:

means for choosing the volume in space as an input parameter;

means for determining target coordinates of the target based on volume coordinates of the volume in space and on an interrogation signal reflected from the target;

means for selecting at least one unique web site identifier that corresponds to the target coordinates; and means for downloading web site data corresponding to the selected web site identifier.

27. Computer program product for associating a volume in space with a web site, comprising:

means for determining platform coordinates of a user observation platform, wherein the user observation platform is remote from the volume in space;

means for interrogating the target occupying the volume in space;

means for receiving an interrogation signal, the interrogation signal reflected from the target;

means for determining volume coordinates of the volume in space based on the platform coordinates and the interrogation signal;

means for comparing the volume coordinates to a database of listed volume coordinates, wherein each listed volume coordinate corresponds to a web site identifier; and means for selecting at least one web site identifier corresponding to listed volume coordinates which match the volume coordinates.

* * * * *